(12) United States Patent
Banka et al.

(10) Patent No.: US 11,323,312 B1
(45) Date of Patent: May 3, 2022

(54) SOFTWARE-DEFINED NETWORK MONITORING AND FAULT LOCALIZATION

(71) Applicant: Juniper Networks, Inc., Sunnyvale, CA (US)

(72) Inventors: Tarun Banka, Milpitas, CA (US); Harshit Naresh Chitalia, Mountain View, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 0 days.

(21) Appl. No.: 17/105,462

(22) Filed: Nov. 25, 2020

(51) Int. Cl.
| | |
|---|---|
| *H04L 12/24* | (2006.01) |
| *H04L 41/0677* | (2022.01) |
| *H04W 28/24* | (2009.01) |
| *H04L 43/12* | (2022.01) |
| *H04W 24/08* | (2009.01) |
| *H04W 28/02* | (2009.01) |

(52) U.S. Cl.
CPC .......... *H04L 41/0677* (2013.01); *H04L 43/12* (2013.01); *H04W 24/08* (2013.01); *H04W 28/0268* (2013.01); *H04W 28/24* (2013.01)

(58) Field of Classification Search
CPC ..... H04L 41/12; H04L 41/0631; H04L 65/80; H04L 61/2007; H04L 61/6022; H04L 41/5067; H04W 4/18
See application file for complete search history.

(56) References Cited

U.S. PATENT DOCUMENTS

| | | |
|---|---|---|
| 6,760,328 B1 | 7/2004 | Ofek |
| 7,042,838 B1 | 5/2006 | Shand et al. |
| 7,184,437 B1 | 2/2007 | Cole et al. |
| 7,519,006 B1 | 4/2009 | Wing |
| 7,606,887 B1 | 10/2009 | Stewart et al. |

(Continued)

FOREIGN PATENT DOCUMENTS

| | | |
|---|---|---|
| CN | 101582845 A | 11/2009 |
| CN | 101917331 A | 12/2010 |

(Continued)

OTHER PUBLICATIONS

Bocci et al., "MPLS Generic Associated Channel," RFC 5586, Network Working Group, Jun. 2009, 19 pp.

(Continued)

*Primary Examiner* — Syed Ali
(74) *Attorney, Agent, or Firm* — Shumaker & Sieffert, P.A.

(57) ABSTRACT

The disclosure describes techniques for network monitoring and fault localization. For example, a controller comprises one or more processors operably coupled to a memory configured to: receive a first one or more Quality of Experience (QoE) metrics measured by a first probe traversing a first path comprising one or more links; receive a second one or more QoE metrics measured by a second probe traversing a second path comprising one or more links; determine, from the first one or more QoE metrics, that the first path has an anomaly; determine, from the second one or more QoE metrics, that the second path has an anomaly; and determine, in response to determining the first path and the second path has an anomaly, based on the type of metrics and the type of links, that an intersection between the first path and the second path is a root cause of the anomaly.

15 Claims, 6 Drawing Sheets

(56) References Cited

U.S. PATENT DOCUMENTS

| | | | |
|---|---|---|---|
| 7,937,492 | B1 | 5/2011 | Kompella et al. |
| 7,996,556 | B2 | 8/2011 | Raghavan et al. |
| 8,339,959 | B1 | 12/2012 | Moisand et al. |
| 8,693,374 | B1 | 4/2014 | Murphy et al. |
| 9,094,308 | B2 | 7/2015 | Ghose et al. |
| 9,531,617 | B2 | 12/2016 | Karame |
| 9,596,159 | B2 | 3/2017 | Ghose et al. |
| 9,787,559 | B1 | 10/2017 | Schroeder |
| 10,135,701 | B2 | 11/2018 | Wu et al. |
| 10,200,248 | B1 | 2/2019 | Jiang et al. |
| 10,848,403 | B1 | 11/2020 | Schroeder |
| 2005/0081116 | A1 | 4/2005 | Bejerano et al. |
| 2007/0177518 | A1 | 8/2007 | Li et al. |
| 2007/0195797 | A1 | 8/2007 | Patel et al. |
| 2007/0223388 | A1 | 9/2007 | Arad et al. |
| 2008/0044181 | A1 | 2/2008 | Sindhu |
| 2008/0267073 | A1 | 10/2008 | Thaler |
| 2009/0037713 | A1 | 2/2009 | Khalid et al. |
| 2009/0040942 | A1 | 2/2009 | Yang |
| 2009/0304007 | A1 | 12/2009 | Tanaka et al. |
| 2010/0061242 | A1 | 3/2010 | Sindhu et al. |
| 2011/0006818 | A1 | 1/2011 | Takagi et al. |
| 2011/0063988 | A1 | 3/2011 | Lee et al. |
| 2011/0103259 | A1 | 5/2011 | Aybay et al. |
| 2011/0158105 | A1 | 6/2011 | Duffield et al. |
| 2011/0206055 | A1 | 8/2011 | Leong |
| 2011/0267952 | A1 | 11/2011 | Ko et al. |
| 2011/0307889 | A1 | 12/2011 | Moriki et al. |
| 2012/0011170 | A1 | 1/2012 | Elad et al. |
| 2012/0057454 | A1* | 3/2012 | Kruglick ............... H04W 28/16 370/230 |
| 2012/0207161 | A1 | 8/2012 | Uppalli et al. |
| 2012/0230186 | A1 | 9/2012 | Lee et al. |
| 2012/0233308 | A1 | 9/2012 | Van De Houten et al. |
| 2012/0257631 | A1 | 10/2012 | Nguyen |
| 2012/0311132 | A1 | 12/2012 | Tychon et al. |
| 2013/0100816 | A1 | 4/2013 | Bergamasco et al. |
| 2013/0223208 | A1* | 8/2013 | Liao ...................... H04L 47/805 370/229 |
| 2013/0294243 | A1 | 11/2013 | Wiley et al. |
| 2013/0297774 | A1 | 11/2013 | Pope et al. |
| 2014/0192804 | A1 | 7/2014 | Ghanwani et al. |
| 2014/0233385 | A1 | 8/2014 | Beliveau et al. |
| 2014/0321459 | A1 | 10/2014 | Kumar et al. |
| 2015/0143363 | A1 | 5/2015 | Gombert et al. |
| 2016/0026490 | A1 | 1/2016 | Johnsson et al. |
| 2016/0094398 | A1 | 3/2016 | Choudhury et al. |
| 2016/0174081 | A1* | 6/2016 | Lau ....................... G06F 16/904 455/457 |
| 2016/0380892 | A1 | 12/2016 | Mahadevan et al. |
| 2017/0126475 | A1 | 5/2017 | Mahkonen et al. |
| 2018/0309636 | A1* | 10/2018 | Strom ................. H04L 43/0882 |
| 2018/0367421 | A1* | 12/2018 | Cloonan .............. H04L 41/145 |
| 2020/0267114 | A1* | 8/2020 | Ramamurthy ...... H04L 67/1002 |
| 2020/0296023 | A1* | 9/2020 | Kumar ................. H04L 43/103 |
| 2020/0296029 | A1 | 9/2020 | Shenoy et al. |
| 2021/0092036 | A1* | 3/2021 | Jain ..................... H04L 41/5019 |
| 2021/0204011 | A1* | 7/2021 | Jain ................. H04N 21/23439 |

FOREIGN PATENT DOCUMENTS

| | | |
|---|---|---|
| EP | 1890438 A1 | 2/2008 |
| EP | 3389220 A1 | 10/2018 |
| WO | 2013184846 A1 | 12/2013 |

OTHER PUBLICATIONS

Bradner et al., "Benchmarking Methodology for Network Interconnect Devices," RFC 2544, Network Working Group, Mar. 1999, 31 pp.

Conta et al., "Internet Control Message Protocol (ICMPv6) for the Internet Protocol Version 6 (IPv6) Specification," RFC 4443, Network Working Group, Mar. 2006, 24 pp.

Hopps et al., "Analysis of an Equal-Cost Multi-Path Algorithm," RFC 2992, Network Working Group, Nov. 2000, 8 pp.

ITU-T Y.1564, Series Y: Global Information Infrastructure, Internet Protocol Aspects and Next-Generation Networks, Internet protocol aspects—Quality of service and network performance, Ethernet service activation test methodology, The International Telecommunication Union, Mar. 2011, 38 pp.

ITU-T Y.1731, Series Y: Global Information Infrastructure, Internet Protocol Aspects and Next-Generation Networks, Internet protocol aspects—Operation administration and maintenance, OAM functions and mechanisms for Ethernet based networks, The International Telecommunication Union, May 2006, 80 pp.

Katz et al., Bidirectional Forwarding Detection (BFD) for IPv4 and IPv6 (Single Hop), RFC 5881, Internet Engineering Task Force (IETF), Jun. 2010, 7 pp.

Katz et al., "Bidirectional Forwarding Detection (BFD)," RFC 5880, Internet Engineering Task Force, Jun. 2010, 49 pp.

Kompella et al., "Detecting Multi-Protocol Label Switched (MPLS) Date Plane Failures," RFC 4379, Network Working Group, Feb. 2006, 50 pp.

Nadeau et al., "Pseudowire Virtual Circuit Connectivity Verification (VCCV): A Control Channel for Pseudowires" RFC 5085, Network Working Group, Dec. 2007, 30 pp.

Niu et al., "Service Chaining Header and Service Chaining Mechanism," Internet Draft, Network Working Group, Jul. 15, 2013, 9 pp.

Postel, "Internet Control Message Protocol—DARPA Internet Program Protocol Specification," RFC 792, Information Sciences Institute, Network Working Group, Sep. 1981, 21 pp.

Saxena et al., "Detecting Data-Plane Failures in Point-to-Multipoint MPLS—Extensions to LSP Ping," RFC 6425, Internet Engineering Task Force (IETF), Nov. 2011, 28 pp.

U.S. Appl. No. 17/081,736, filed Oct. 27, 2020, naming inventor Schroeder.

"Reference Environment," VMware, VMware vCloud NFV OpenStack Edition, Retrieved from: https://docs.vmware.com/en/VMware-vCloud-NFV-OpenStack-Edition/3.1/vloud-nfv-edge-reference-arch-31/GUID-38D7D7FF-AF8E-4EEB-8E27-C67659662960.html, Jun. 28, 2019, 3 pp.

Guo et al., "Pingmesh: A Large-Scale System for Data Center Network Latency Measurement and Analysis," ACM, SIGCOMM '15, Aug. 17- 21, 2015, pp. 139-152.

Lapukhov et al., "NetNORAD: Troubleshooting networks via end-to-end probing," Retrieved from: https://code.fb.com/core-data/netnorad-troubleshooting-networks-via-end-to-end-probing/, Feb. 18, 2016, 7 pp.

Rodbro et al., "Prediction of Bandwidth and Additive Metrics for Large Scale Network Tomography," Microsoft Research Technical Report MSR-TR-2016-57, May 2016, 12 pp.

Guilbaud et al., "Localizing packet loss," Google, Retrieved from: https://www.nanog.org/meetings/nanog57/presentations/Tuesday/tues.general.GuilbaudCartlidge.Topology.7.pdf, Feb. 5, 2013, 43 pp.

"Configuring RPM Probes," Juniper Networks, Technical Documentation, Retrieved Feb. 9, 2021 from: https://web.archive.org/web/20171114232528/https://www.juniper.net/documentation/en_US/junos/topics/task/configuration/rpm-probes-configuring.html, Last Modified Aug. 16, 2017, 4 pp.

"Configuring IP SLA," Chapter from: Catalyst 4500 Series Switch Software Configuration Guide, 12.2(44)SG, Cisco, Retrieved Feb. 9, 2021 from: https://www.cisco.com/c/en/us/td/docs/switches/lan/catalyst4500/12-2/44sg/configuration/guide/Wrapper-44SG/swipsla.html, Updated Feb. 13, 2018, 13 pp.

Yu et al., "Software Defined Traffic Measurement with OpenSketch," USENIX Association, 10th USENIX Symposium on Networked Systems Design and Implementation (NSDI '13), Retrieved from: http://stanford.edu/~lavanyaj/papers/opensketch12.pdf, Apr. 2-5, 2013, pp. 29-42.

Kompella et al., "Detection and Localization of Network Black Holes," IEEE, In Proceedings of 26th IEEE International Conference on Computer Communications (INFOCOM 2007), May 6-12, 2007, 9 pp.

(56) References Cited

OTHER PUBLICATIONS

Peng et al., "deTector: a Topology-aware Monitoring System for Data Center Networks," in Proceedings of the 2017 USENIX Annual Technical Conference (USENIX ATC '17), Jul. 12-14, 2017, 15 pp.

Govindan et al., "Evolve or Die: High-Availability Design Principles Drawn from Google's Network Infrastructure," ACM, SIGCOMM '16, Aug. 22-26, 2016, 15 pp.

Al-Fares et al., "A Scalable, Commodity Data Center Network Architecture," in Proceedings of ACM SIGCOMM Computer Communication Review, Aug. 17-22, 2008, pp. 63-74.

Lapukhov, "Move Fast, Unbreak Things!," Facebook, Retrieved from: https://www.nanog.org/sites/default/files/Lapukhov_Move_Fast_Unbreak.pdf, Feb. 2016, 46 pp.

Gill et al., "Understanding Network Failures in Data Centers: Measurement, Analysis, and Implications," in Proceedings of ACM, SIGCOMM'II, Aug. 15-19, 2011, pp. 350-361.

"PingMesh + NetBouncer: Fine-Grained Path and Link Monitoring for DC," Microsoft, Presenter: Albert Greenberg, Accessed: https://www.youtube.com/watch?v=nfEOEKIInK8, May 24, 2016, 1 pp.

Brodie et al., "Optimizing Probe Selection for Fault Localization," in Proceedings of the 12th International Workshop on Distributed Systems: Operations and Management (DSOM 01'), Oct. 15-17, 2001, 12 pp.

"What is Istio?," Istio 1.9, 2020 Istio Authors, Retrieved Feb. 9, 2021 from: https://istio.io/docs/concepts/what-is-istio/, Page last modified: Jul. 15, 2020, 4 pp.

"Service Instance Health Check," Juniper Networks, Technical Documentation—Support, Retrieved Feb. 9, 2021 from: https:/fwww.juniper.neUdocumentationfen_US/contrail4.0/topics/concepUservice-liveness-check.html, Page Modified Nov. 14, 2016, 4 pp.

"Vertex Cover Problem I Set 1 (Introduction and Approximate Algorithm)," GeeksforGeeks, Retrieved Feb. 9, 2021 from: https://www.geeksforgeeks.org/vertex-cover-problem-set-1-introduction-approximate-algorithm-2/, Last Updated: Nov. 4, 2020, 18 pp.

Extended Search Report from counterpart European Application No. 21156899.3, dated Jul. 9, 2021, 10 pp.

\* cited by examiner

SOFTWARE-DEFINED NETWORK MONITORING AND FAULT LOCALIZATION

TECHNICAL FIELD

The disclosure relates to computer networks.

BACKGROUND

Over the last few decades, the Internet has grown exponentially from a small network comprising of few nodes to a worldwide pervasive network that services more than a billion users. Today, individual subscribers are not limited to running a few network sessions with voice and/or data downloads over the network. Instead, the extent of services used by subscribers varies widely from multimedia gaming, audio and video streaming, web services, voice over IP (VoIP), and the like. With new technology penetration, such as increased utilization of Internet of Things (IoT) and M2M (machine to machine) communications, the network services and the software applications that a given subscriber may require also varies from a few sessions to multiple sessions having concurrent flows. This number is growing rapidly as subscribers increasingly run multiple applications, services, transactions simultaneously. The increased amount and variety of subscriber sessions and packet flows create challenges for network service providers with respect to network performance, such as latency, delay, and jitter.

SUMMARY

In general, the disclosure describes techniques for providing network monitoring and fault localization. For example, a controller such as a Software-Defined Networking (SDN) controller that implements the techniques described herein may detect anomalies within a network by sending probe packets through the network to measure Quality of Experience (QoE) metrics such as latency, jitter, packet-loss and any other metrics.

In some examples, the controller may evaluate traffic flows to construct a topology of the network, and use the topology to create an enhanced probing plan implemented in the topology, such as by pruning the topology to cease some of the probing processes that the controller determines to be redundant (e.g., sending probe packets on a link shared with multiple paths), thereby reducing the overall traffic in the network. For example, rather than instructing each node (e.g., computing device) in the network to send probe packets to measure QoE metrics for each link connected to the node device and/or for each other node in the network, the controller may use the topology to select a minimum number of paths that cover all links and configure a minimum number of nodes on the paths to send probe packets to measure the QoE metrics.

The controller may use QoE metrics to determine anomalies within the network. Some monitoring mechanisms, such as white box monitoring and black box monitoring, are unable to localize the root cause (e.g., a particular link or node) of the anomalies in the network without being process intensive (e.g., by sending probes to each node in the network), error prone, or requiring additional manual troubleshooting.

In accordance with the techniques described herein, the controller may detect one or more anomalies from the QoE metrics and perform fault localization of the node or link causing the one or more anomalies. In one example, the controller may evaluate the QoE metrics relative to a computed baseline value to detect an anomaly (e.g., determining a deviation from the baseline value). In response to determining that a plurality of probe paths have an anomaly, the controller may determine an intersection (e.g., overlapping link) of the probe paths that have the anomaly, and determine than an intersection of the probe paths is a root cause of the anomaly. In some examples, the controller may determine the type of QoE metric being measured, and/or the type of link (e.g., wired or wireless link). In these examples, if the metric is a loss metric, the controller may determine that a wireless link of a path is a root cause of the loss anomaly.

The techniques described herein may provide one or more technical advantages. For example, by implementing the techniques described herein, nodes send fewer probe packets to detect anomalies while still determining the root cause of the anomalies. In this way, processor usage, memory usage, and/or power consumption may be reduced without needing to manually troubleshoot to determine the root cause of the anomalies.

In one example of the techniques described herein, a method is described, the method including receiving, by a controller for a network that includes a plurality of node devices, a first one or more Quality of Experience (QoE) metrics measured by a first probe traversing a first path comprising one or more links; receiving, by the controller, a second one or more QoE metrics measured by a second probe traversing a second path comprising one or more links; determining, by the controller and from the first one or more QoE metrics, that the first path has an anomaly; determining, by the controller and from the second one or more QoE metrics, that the second path has an anomaly; determining, by the controller, a type of metrics of the first one or more QoE metrics and the second one or more QoE metrics, and a type of links of the one or more links of the first path and the one or more links of the second path; and determining, by the controller and in response to determining the first path and the second path has an anomaly, based on the type of metrics and the type of links, that an intersection between the first path and the second path is a root cause of the anomaly.

In another example of the techniques described herein, a controller for a network that includes a plurality of node devices is described. The controller includes one or more processors operably coupled to a memory, wherein the one or more processors are configured to: receive a first one or more Quality of Experience (QoE) metrics measured by a first probe traversing a first path comprising one or more links; receive a second one or more QoE metrics measured by a second probe traversing a second path comprising one or more links; determine, from the first one or more QoE metrics, that the first path has an anomaly; determine, from the second one or more QoE metrics, that the second path has an anomaly; determine, a type of metrics of the first one or more QoE metrics and the second one or more QoE metrics, and a type of links of the one or more links of the first path and the one or more links of the second path; and determine, in response to determining the first path and the second path has an anomaly, based on the type of metrics and the type of links, an intersection between the first path and the second path is a root cause of the anomaly.

In another example of the techniques described herein, a non-transitory computer-readable storage medium is described, the non-transitory computer-readable storage medium comprising instructions for causing one or more programmable processors of a controller to: receive a first one or more Quality of Experience (QoE) metrics measured by a first probe traversing a first path comprising one or more links; receive a second one or more QoE metrics measured by a second probe traversing a second path comprising one or more links; determine, from the first one or more QoE metrics, that the first path has an anomaly; determine, from the second one or more QoE metrics, that the second path has an anomaly; determine a type of metrics of the first one or more QoE metrics and the second one or more QoE metrics, and a type of links of the one or more links of the first path and the one or more links of the second path; and determine, in response to determining the first path and the second path has an anomaly, based on the type of metrics and the type of links, that an intersection between the first path and the second path is a root cause of the anomaly.

The details of one or more examples are set forth in the accompanying drawings and the description below. Other features, objects, and advantages will be apparent from the description and drawings, and from the claims.

DETAILED DESCRIPTION

Figure 1:
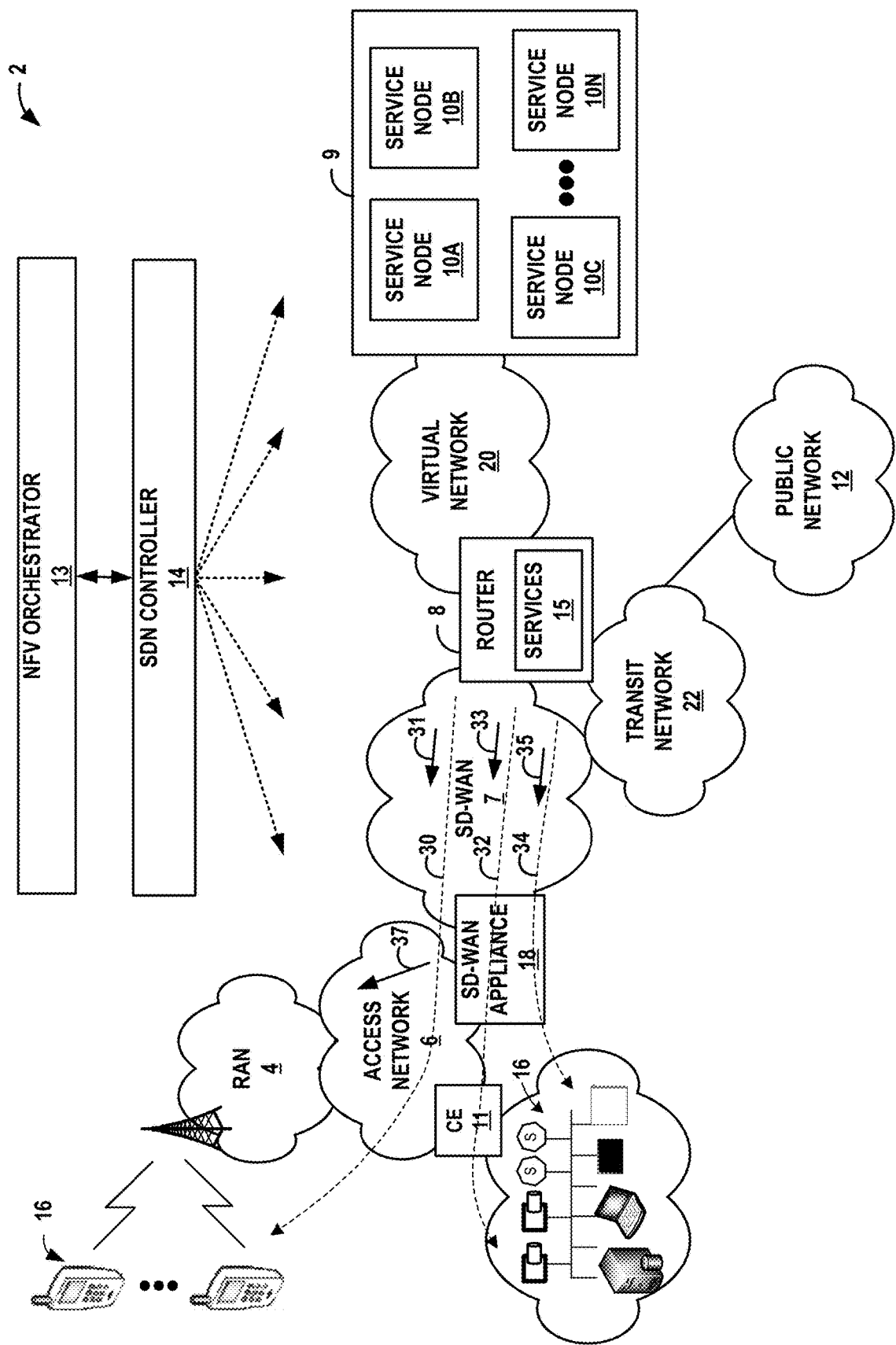
FIG. 1 is a block diagram illustrating an example network system that provides network monitoring and fault localization, in accordance with the techniques described in this disclosure.

FIG. 1 is a block diagram illustrating an example network system 2 ("network system 2") that provides network monitoring and fault localization, in accordance with the techniques described herein. As one example, network system 2 may represent software-defined network system.

Network system 2 may operate as a private network to provide packet-based network services to subscriber devices 16. That is, network system 2 provides authentication and establishment of network access for subscriber devices 16 such that a subscriber device may begin exchanging data packets with public network 12, which may be an internal or external packet-based network such as the Internet.

In the example of FIG. 1, network system 2 comprises access network 6 that provides connectivity to public network 12 via service provider software-defined wide area network 7 (hereinafter, "SD-WAN 7") and router 8. SD-WAN 7 and public network 12 provide packet-based services that are available for request and use by subscriber devices 16. As examples, SD-WAN 7 and/or public network 12 may provide bulk data delivery, voice over Internet protocol (VoIP), Internet Protocol television (IPTV), Short Messaging Service (SMS), Wireless Application Protocol (WAP) service, or customer-specific application services. Public network 12 may comprise, for instance, a local area network (LAN), a wide area network (WAN), the Internet, a virtual LAN (VLAN), an enterprise LAN, a layer 3 virtual private network (VPN), an Internet Protocol (IP) intranet operated by the service provider that operates access network 6, an enterprise IP network, or some combination thereof. In various examples, public network 12 is connected to a public WAN, the Internet, or to other networks. Public network 12 executes one or more packet data protocols (PDPs), such as IP (IPv4 and/or IPv6), X.25 or Point-to-Point Protocol (PPP), to enable packet-based transport of public network 12 services.

In general, subscriber devices 16 connect to gateway router 8 via access network 6 to receive connectivity to subscriber services for applications hosted by public network 12 or router 8. A subscriber may represent, for instance, an enterprise, a residential subscriber, or a mobile subscriber. Subscriber devices 16 may be, for example, personal computers, laptop computers or other types of computing devices positioned behind customer equipment (CE) 11, which may provide local routing and switching functions. Each of subscriber devices 16 may run a variety of software applications, such as word processing and other office support software, web browsing software, software to support voice calls, video games, video conferencing, and email, among others. For example, subscriber device 16 may be a variety of network-enabled devices, referred generally to as "Internet-of-Things" (IoT) devices, such as cameras, sensors (S), televisions, appliances, etc. In addition, subscriber devices 16 may comprise mobile devices that access the data services of network system 2 via a radio access network (RAN) 4. Example mobile subscriber devices include mobile telephones, laptop or desktop computers having, e.g., a wireless card, wireless-capable netbooks, tablets, video game devices, pagers, smart phones, personal data assistants (PDAs) or the like.

A network service provider operates, or in some cases leases, elements (e.g., network devices) of access network 6 to provide packet transport between subscriber devices 16 and router 8. Access network 6 represents a network that aggregates data traffic from one or more of subscriber devices 16 for transport to/from SD-WAN 7 of the service provider. Access network 6 includes network nodes that execute communication protocols to transport control and user data to facilitate communication between subscriber devices 16 and router 8. Access network 6 may include a broadband access network, a wireless LAN, a public switched telephone network (PSTN), a customer premises equipment (CPE) network, or other type of access network, and may include or otherwise provide connectivity for cellular access networks, such as a radio access network (RAN), e.g., RAN 4. Examples include networks conforming to a $5^{th}$ Generation (5G) mobile network, Universal Mobile Telecommunications System (UMTS) architecture, an evolution of UMTS referred to as Long Term Evolution (LTE), mobile IP standardized by the Internet Engineering Task Force (IETF), as well as other standards proposed by the $3^{rd}$ Generation Partnership Project (3GPP), $3^{rd}$ Generation Partnership Project 2 (3GGP/2) and the WiMAX forum. SD-WAN appliance 18 may be a customer edge (CE) router, a provider edge (PE) router, or other network device that provides connectivity between access network 6 and SD-WAN 7. SD-WAN 7 offers packet-based connectivity to subscriber devices 16 attached to access network 6 for accessing public network 12 (e.g., the Internet). SD-WAN 7 may represent a public network that is owned and operated by a service provider to interconnect a plurality of networks, which may include access network 6. In some examples, SD-WAN 7 may implement Multi-Protocol Label Switching (MPLS) forwarding and in such instances may be referred to as an MPLS network or MPLS backbone. In some instances, SD-WAN 7 represents a plurality of interconnected autonomous systems, such as the Internet, that offers services from one or more service providers. Public network 12 may represent the Internet. Public network 12 may represent an edge network coupled to SD-WAN 7 via a transit network 22 and one or more network devices, e.g., a customer edge device such as customer edge switch or router. Public network 12 may include a data center. In the example of FIG. 1, router 8 may exchange packets with service nodes 10 via virtual network 20, and router 8 may forward packets to public network 12 via transit network 22.

In examples of network system 2 that include a wireline/broadband access network, router 8 may represent a Broadband Network Gateway (BNG), Broadband Remote Access Server (BRAS), MPLS PE router, core router or gateway, or Cable Modem Termination System (CMTS). In examples of network system 2 that include a cellular access network as access network 6, router 8 may represent a mobile gateway, for example, a Gateway General Packet Radio Service (GPRS) Serving Node (GGSN), an Access Gateway (aGW), or a Packet Data Network (PDN) Gateway (PGW). In other examples, the functionality described with respect to router 8 may be implemented in a switch, service card or another network element or component. In some examples, router 8 may itself be a service node.

A network service provider that administers at least parts of network system 2 typically offers services to subscribers associated with devices, e.g., subscriber devices 16, that access network system 2. Services offered may include, for example, traditional Internet access, VoIP, video and multimedia services, and security services. As described above with respect to SD-WAN 7, SD-WAN 7 may support multiple types of access network infrastructures that connect to service provider network access gateways to provide access to the offered services. In some instances, the network system may include subscriber devices 16 that attach to multiple different access networks 6 having varying architectures.

In general, any one or more of subscriber devices 16 may request authorization and data services by sending a session request to a gateway device such as SD-WAN appliance 18 or router 8. In turn, SD-WAN appliance 18 may access a central server (not shown) such as an Authentication, Authorization and Accounting (AAA) server to authenticate the one of subscriber devices 16 requesting network access. Once authenticated, any of subscriber devices 16 may send subscriber data traffic toward SD-WAN 7 to access and receive services provided by public network 12, and such packets may traverse router 8 as part of at least one packet flow. In some examples, SD-WAN appliance 18 may forward all authenticated subscriber traffic to public network 12, and router 8 may apply services 15 and/or steer particular subscriber traffic to a data center 9 if the subscriber traffic requires services on service nodes 10. Applications (e.g., service applications) to be applied to the subscriber traffic may be hosted on service nodes 10.

For example, when forwarding subscriber traffic, router 8 may direct individual subscriber packet flows through services 15 executing on one or more service cards installed within router 8. In addition, or alternatively, network system 2 includes a data center 9 having a cluster of service nodes 10 that provide an execution environment for the mostly virtualized network services. In some examples, each of service nodes 10 represents a service instance. Each of service nodes 10 may apply one or more services to traffic flows. As such, router 8 may steer subscriber packet flows through defined sets of services provided by service nodes 10. That is, in some examples, each subscriber packet flow may be forwarded through a particular ordered combination of services provided by service nodes 10, each ordered set being referred to herein as a "service chain." As examples, services 15 and/or service nodes 10 may apply stateful firewall (SFW) and security services, deep packet inspection (DPI), carrier grade network address translation (CGNAT), traffic destination function (TDF) services, media (voice/video) optimization, Internet Protocol security (IPSec)/virtual private network (VPN) services, hypertext transfer protocol (HTTP) filtering, counting, accounting, charging, and/or load balancing of packet flows, or other types of services applied to network traffic.

In the example of FIG. 1, subscriber packet flows may be directed along a service chain that includes any of services 15 and/or services applied by service nodes 10. Once processed at a terminal node of the service chain, i.e., the last service to be applied to packets flowing along a particular service path, the traffic may be directed to public network 12.

Whereas a "service chain" defines one or more services to be applied in a particular order to provide a composite service for application to packet flows bound to the service chain, a "service tunnel" or "service path" refers to a logical and/or physical path taken by packet flows processed by a service chain along with the forwarding state for forwarding packet flows according to the service chain ordering. Each service chain may be associated with a respective service tunnel, and packet flows associated with each subscriber device 16 flow along service tunnels in accordance with a service profile associated with the respective subscriber. For example, a given subscriber may be associated with a particular service profile, which in turn is mapped to a service tunnel associated with a particular service chain. Similarly, another subscriber may be associated with a different service profile, which in turn is mapped to a service tunnel associated with a different service chain. In some examples, after SD-WAN appliance 18 has authenticated and established access sessions for the subscribers, SD-WAN appliance 18 or router 8 may direct packet flows for the subscribers along the appropriate service tunnels, thereby causing data center 9 to apply the requisite ordered services for the given subscriber. In some examples, SDN controller 14 may also provide a forwarding rule set to SD-WAN appliance 18 or router 8 for managing the forwarding path. In some examples, SDN controller 14 manages the forwarding path through all elements in data center 9 starting at router 8.

In some examples, service nodes 10 may implement service chains using internally configured forwarding state that directs packets of the packet flow along the service chains for processing according to the identified set of service nodes 10. Such forwarding state may specify tunnel interfaces for tunneling between service nodes 10 using network tunnels such as IP or Generic Route Encapsulation (GRE) tunnels, Network Virtualization using GRE (NVGRE), or by using VLANs, Virtual Extensible LANs (VXLANs), MPLS techniques, and so forth. In some instances, real or virtual switches, routers or other network elements that interconnect service nodes 10 may be configured to direct the packet flow to the service nodes 10 according to service chains.

In the example of FIG. 1, network system 2 comprises a software defined network (SDN) and network functions virtualization (NFV) architecture. SDN controller device 14 may provide a controller for configuring and managing the routing and switching infrastructure of network system 2. While some instances described herein relate to SD-WAN appliance 18 performing the edge-based routing techniques described herein, SDN controller 14 may also perform these techniques for network system 2. NFV orchestrator device 13 may provide a high-level orchestrator for configuring and managing virtualization of network services into service nodes 10 of data center 9. In some instances, SDN controller 14 manages deployment of virtual machines (VMs) within the operating environment of data center 9. For example, SDN controller 14 may interact with router 8 to specify service chain information. For example, the service chain information provided by SDN controller 14 may specify any combination and ordering of services provided by service nodes 10, traffic engineering information for tunneling or otherwise transporting packet flows along service paths, rate limits, Type of Service (TOS) markings or packet classifiers that specify criteria for matching packet flows to a particular service chain. Further example details of an SDN controller are described in PCT International Patent Application PCT/US13/44378, filed Jun. 5, 2013, the entire content of which is incorporated herein by reference.

Although illustrated as part of data center 9, service nodes 10 may be network devices coupled by one or more switches or virtual switches of SD-WAN 7. In one example, each of service nodes 10 may run as VMs in a virtual compute environment. Moreover, the compute environment may comprise a scalable cluster of general computing devices, such as x86 processor-based servers. As another example, service nodes 10 may comprise a combination of general purpose computing devices and special purpose appliances. As virtualized network services, individual network services provided by service nodes 10 can scale just as in a modern data center through the allocation of virtualized memory, processor utilization, storage and network policies, as well as horizontally by adding additional load-balanced VMs. In other examples, service nodes 10 may be gateway devices or other routers. In further examples, the functionality described with respect to each of service nodes 10 may be implemented in a switch, service card, or another network element or component.

As described herein, network elements within network system 2 may perform application data monitoring using various application quality of experience (QoE) metric functions. Example QoE metric functions include active or synthetic probing performed by nodes such as end hosts, underlay network nodes, virtual nodes, or other types of nodes. For example, a network device at an edge of an access network or a data center network (e.g., SD-WAN appliance 18 and router 8) can output probe packets that are transported through overlay tunnels to virtual routers in the data center and back to the network device or another network device. In response to receiving the probe packets, one or more network devices, virtual routers, and applications along the forwarding path of the probe packets can provide probe reporting information to SDN controller 14, which may compile and analyze the probe reporting information and present report information to customers about latency, jitter, packet-loss and any problems in the data center, as it may pertain to SLAs.

In some examples, the metrics carried by probe packets may include one or more of timestamps for sending or receiving a test packet, error estimates for sending or receiving the test packet, a sequence number for sending the test packet, a time-to-live (TTL) value for the test packet, a keepalive packet data unit (PDU), and/or a count of serviced packets, bytes, or subscribers. The one-way and two-way network performance measurements may include keepalive or path connectivity, round trip time (RTT), path delay, packet jitter, packet re-ordering, packet loss, service latency measurements, or service load measurements based on the received metrics.

Depending on the type of node, SDN controller 14 may configure the appropriate probe packet type for the node such as Internet Control Message Protocol (ICMP), User Datagram Protocol (UDP), Transmission Control Protocol (TCP), real-time performance monitoring (RPM), two-way active measurement protocol (TWAMP), IP service level agreement (IP SLA), Bidirectional Forwarding Detection (BFD), etc. For example, network system 2 may include a source end host device of data center 9 that routes packets in an upstream path through an IPinIP tunnel to a core switch, which in turn routes the inner IP packet in a downstream path to a destination end host. In this example, SDN controller 14 may configure an end host in network system 2 to send probes using, for example, ICMP, UDP and/or TCP, to measure QoE metrics of the end-to-end path between the end hosts. Alternatively, or additionally, network system 2 may include network devices (e.g., physical switches) in an underlay network (e.g., edge-to-edge in WAN network or top-of-rack (ToR) switch to ToR in a data center environment). In this example, SDN controller 14 may configure underlay network nodes (e.g., router 8) in network system 2 to send probes using RPM, TWAMP, IP SLA, and/or BFD to measure QoE metrics of the underlay network. Alternatively, or additionally, network system 2 may include virtual nodes (e.g., virtual routers) in an overlay network. In this example, SDN controller 14 may configure virtual nodes in network system 2 to use natively supported probes (e.g., ICMP, UDP, and/or TCP) to measure QoE metrics of the overlay network.

In some examples, network system 2 may include multiple tenants. In this example, each tenant may have different topologies, each with different probing requirements. For example, network system 2 may include a first tenant having end host devices that use TCP to send probes, a second tenant having end host devices that use UDP to send probes, a third tenant having an underlay network device that use TWAMP to send probes, a fourth tenant having an underlay network device that use RPM to send probes, and so on.

In this example, SDN controller 14 may implement a distributed probe selection algorithm to generate an optimized probing plan. SDN controller 14 may generate the probing plan based on a per tenant policy. For example, each tenant of network system 2 may have different probing policies. A first tenant may include a policy to measure QoE metrics between source and destination end hosts, while a second tenant may have a different policy to measure loss from WAN links in SD-WAN 7. As described above, the probing plan may specify an appropriate type of probe (e.g., ICMP, UDP, TWAMP, etc.) depending on the type of selected node.

SDN controller 14 may configure the probing plan based on a probe budget per tenant. For example, the probing plan may specify the number of probes (e.g., probe count) to send, the frequency at which to send the probes, the interval at which to send probes, etc. The frequency at which to send the probes may be determined based on whether the probe path includes wired and/or wireless links. For example, if a path to be probed includes a wireless link, the probing plan may specify sending probes at a higher frequency due to the higher possibility of loss occurring with a wireless link. The number of probes and interval at which to send the probes may be based on current load of probes in the network and probe traffic generated per node. For example, SDN controller 14 may configure an upper bound of probes to be sent and/or an upper bound of probe traffic sent per node.

Additional examples of generating an optimized probing plan are described in U.S. patent application Ser. No. 16/354,402, "PLANNING AND MANAGING NETWORK PROBES USING CENTRALIZED CONTROLLER," filed Mar. 15, 2019, the entire contents of which is incorporated by reference herein. Additional examples of end-to-end monitoring of overlay networks is described in U.S. Pat. No. 9,787,559, "END-TO-END MONITORING OF OVERLAY NETWORKS PROVIDING VIRTUALIZED NETWORK SERVICES," filed Mar. 28, 2014, the entire contents of which is incorporated by reference herein.

In some examples, SDN controller 14 may implement edge-based routing to more accurately measure the various QoE metrics in the network while limiting the number of probes injected into the system. For example, SDN controller 14 may coordinate and map probing processes across network system 2. For instance, SDN controller 14 may construct, for network system 2 that includes a plurality of different node devices, a topological representation for each tenant of network system 2. The topological representation may take any form (e.g., a matrix, a database, a vertex, a graphic, text, or any other data structure) that provides an indication of each of the node devices of a particular tenant and an indication of each link of a plurality of links connected to the node devices. In the example of FIG. 1, SDN controller 14 may create a topological representation of any number of the networks described in network system 2. For instance, the topological representation could be of CEs 11 in access network 6, of subscriber devices 16, of one or more instances of SD-WAN appliance 18 in SD-WAN 7, of one or more virtual nodes in a virtualized environment in datacenter 9, or any combination thereof in an SDN system (e.g., network system 2). SDN controller 14 may determine the routes of the network from routing tables of the network devices.

Based on the topological representation, SDN controller 14 may determine an optimal probe assignment. For example, SDN controller 14 may use the topological representation for each tenant of the network system to determine a minimum number of paths that covers all links and select a minimum number of nodes within the paths to send probe packets. For instance, SDN controller 14 may apply an optimization algorithm, e.g., greedy algorithm-based heuristic, to the topological representation to compute the probe paths and to select nodes within the paths to send probe packets. An example of applying a greedy algorithm to a path matrix is illustrated and described below:

TABLE I

Path Matrix

|  | Link 1 | Link 2 | Link 3 |
|---|---|---|---|
| Path 1 | 1 | 1 | 0 |
| Path 2 | 1 | 0 | 1 |
| Path 3 | 0 | 0 | 1 |

In the example above, SDN controller 14 may apply a greedy algorithm to determine the minimum number of paths that covers link 1, link 2, and link 3. In this example, sending probes on path 1 and path 2 would cover all the links in the network. SDN controller 14 may determine a minimum number of nodes within path 1 and path 2 to send probe packets.

Alternatively, or additionally, the nodes may be selected based on static configuration (e.g., user configuration) of particular nodes to send the probes or a hybrid of both static configuration and heuristic based algorithms. The nodes selected to send probe packets may be referred to herein as "probe generators" and the nodes selected to respond to the probe packets may be referred to herein as "probe responders." A probe generator may perform the active or synthetic probing functions while nodes that are not configured as probe generators do not send probe packets. In this way, only the selected nodes are configured to send probe packets.

In some examples, SDN controller 14 may use a probe intent data model to configure the probe generators and/or probe responders. For example, SDN controller 14 may translate a high-level probe intent data model (e.g., user intent-based network or data models) that defines the probe intent at a high-level (e.g., with more generality) into a lower-level probe configuration data model that defines platform specific configuration used to configure particular endpoints (e.g., end host, underlay network device, virtual node) to use appropriate probe packets. For example, a user may define a high-level probe intent data model to detect latency anomalies in WAN links within SD-WAN 7. In this example, SDN controller 14 may identify the node type as an underlay network device (e.g., SD-WAN appliance 18) and may translate the high-level probe intent data model into a lower-level probe configuration data model to configure SD-WAN appliance 18 to send probes using TWAMP, for example, to measure latency metrics of the WAN links within SD-WAN 7. As another example, a user may define a high-level probe intent data model to detect anomalies in data center 9 that deploys virtual machines. In this example, SDN controller 14 may identify the node type as a virtual node (e.g., virtual router) and may translate the high-level probe intent data model into a lower-level probe configuration data model to configure the virtual router to send probes using ICMP, for example.

The lower-level probe configuration data model may specify, for example, a network address (e.g., IP address) of the probe generator and a network address of the probe responder. The lower-level probe configuration data model may also specify the number of probes to send, an interval at which to send the probes, and/or the frequency at which to send the probes.

The selected nodes configured as probe generators send probes on various paths in the network. In some examples, the probe packets may be generated and analyzed by various components of a node, such as agents of end hosts and/or virtual nodes. SDN controller 14 may receive, from the selected nodes, one or more QoE metrics and may use the one or more QoE metrics to determine whether paths in the network have any problems (e.g., anomalies).

Existing monitoring mechanisms, such as white-box monitoring and black-box monitoring, are unable to perform fault localization to pinpoint the link or node that is the root cause of the problem. For example, white box monitoring is used to monitor applications running on a server. However, in white-box monitoring, each network node is queried for its performance metrics, which is not effective as statistics of the nodes may be error prone or unavailable during their current failure states. Similarly, black-box monitoring send end-to-end probes that are unable to identify a specific link or node that is the root cause of the problem, and requires additional manual troubleshooting to pinpoint the source of the problem.

In accordance with the techniques described in this disclosure, SDN controller 14 may detect anomalies along probe paths and perform fault localization to pinpoint a node or link causing the anomalies. In the example of FIG. 1, a user may specify a high-level probe intent data model to detect latency anomalies between router 8 and subscriber devices 16. In this example, SDN controller 14 may configure router 8 to send probe 31 on path 30 to measure latency from router 8 to a mobile subscriber device 16. Similarly, SDN controller 14 may configure router 8 to send probe 33 on path 32 to measure latency from router 8 to another one of subscriber devices 16. Likewise, SDN controller 14 may configure router 8 to send probe 35 on path 34 to measure latency from router 8 to another one of subscriber devices 16.

SDN controller 14 may receive latency metrics measured from probes 31, 33, and 35, and evaluate the latency metrics with a computed baseline latency value to detect for anomalies in the probing paths. In some examples, SDN controller 14 receives QoE metrics for each tenant of network system 2 and aggregates the QoE metrics for each tenant to compute a set of QoE metrics and evaluates the set of QoE metrics with a computed baseline value.

The baseline value may be computed from historical data of the QoE metrics and may be dynamically updated as QoE metrics are updated. In other examples, the baseline value may be statically configured. For example, the baseline latency value may be computed based on latency metrics previously measured on paths 30, 32, and 34 or statically configured by a user. The computed baseline value may be a threshold, a range, or any value to determine whether the metrics meet the baseline value or whether the metrics deviate from the baseline value (i.e., an anomaly).

If SDN controller 14 determines that a plurality of paths have anomalies, SDN controller 14 may determine if the plurality of paths have an intersection, e.g., any overlapping links. If the plurality of paths have at least one overlapping link, SDN controller 14 determines whether the at least one overlapping link is the root cause of the anomalies. The root cause determination may depend on the type of QoE metric measured and/or whether the links of the paths include a wireless link.

For example, SDN controller 14 may determine paths 32 and 34 each have a latency anomaly and determines that paths 32 and 34 have at least one overlapping link, e.g., a WAN link in SD-WAN 7. In this example, if the latency metric for each of paths 32 and 34 deviates from the baseline latency value, SDN controller 14 may determine that the overlapping WAN link may be the root cause of the anomalies.

In some examples, SDN controller 14 may determine whether the paths include wired or wireless links when determining the root cause of the anomalies. For example, path 30 may include a wireless link, and path 32 may include a wired link. In this example, SDN controller 14 may receive a first loss metric for path 30 and a second loss metric for path 32 and determine that each of paths 30 and 32 include an anomaly. In this example, SDN controller 14 determines that path 30 includes a wireless link. If the first loss metric for path 30 deviates from the second loss metric for path 32, SDN controller 14 may determine that the wireless link is a candidate for the root cause of the anomaly because a wireless link is more likely to drop packets and thus likely to be the cause of the packet loss. SDN controller 14 may then configure the edge node to the wireless link to send an additional probe, e.g., probe 37, on the wireless link to determine if the wireless link is in fact the root cause of the anomaly.

Figure 2:
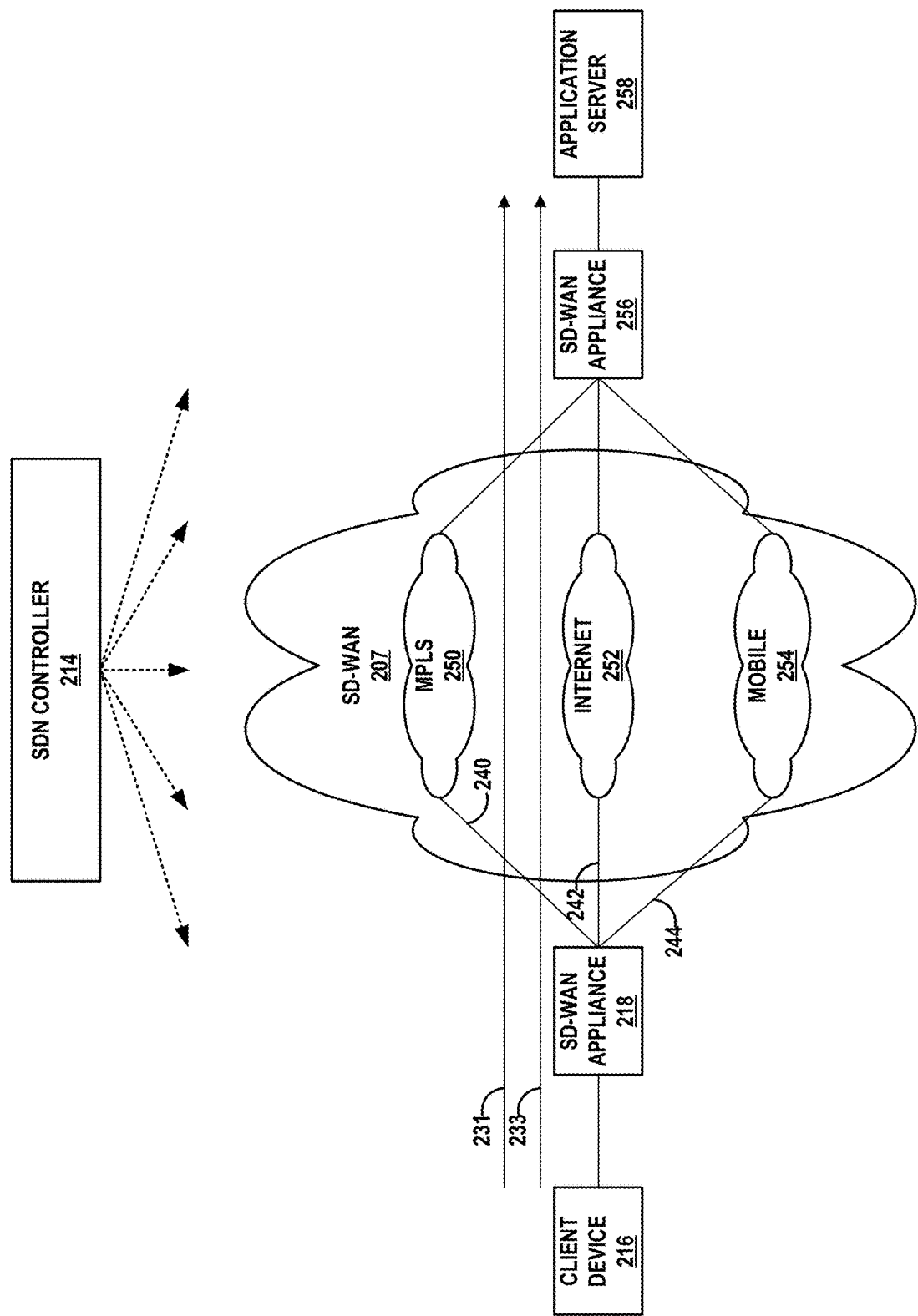
FIG. 2 is a block diagram illustrating an example software-defined wide area network, in accordance with one or more techniques described in this disclosure.

FIG. 2 is a block diagram illustrating an example SD-WAN 207, in accordance with one or more techniques described in this disclosure. SD-WAN 207 in FIG. 2 may represent an example instance of SD-WAN 7 in FIG. 1. In the example of FIG. 2, SD-WAN 207 includes three different WAN links: a first WAN link 240 coupling SD-WAN appliance 218 to a Multi-Protocol Layer Switching (MPLS) network 250, a second WAN link 242 coupling SD-WAN appliance 218 to Internet 252, and a third WAN link 244 coupling SD-WAN appliance 218 to a mobile network 254 (e.g., LTE/5G). In other examples, SD-WAN 207 may include any number of links of any suitable type for transmitting data flows between the client side (e.g., client device 216 and SD-WAN appliance 218) and the application side (e.g., SD-WAN appliance 256 and application server 258).

In the example of FIG. 2, controller 214 may configure any type of node, e.g., client device 216, SD-WAN appliance 218, SD-WAN appliance 256, and/or application server 258 to send an appropriate type of probe packet to measure QoE metrics. In this example, controller 214 may configure client device 216 may send probes 231 and 233 along end-to-end paths between client device 216 and application server 258. For example, client device 216 may represent an end host. In this example, controller 214 may configure client device 216 to send an appropriate type of probe (e.g., ICMP echo, UDP ping, or TCP ping) to measure QoE metrics along the end-to-end path to application server 258.

In this example, SDN controller 214 may detect anomalies along paths measured by probes 231, 233 and perform fault localization to pinpoint a node or link causing the anomalies. In this example, SDN controller 214 may configure client device 218 to send probe 231 on a first end-to-end path to application server 258 using a WAN link in SD-WAN 207 and configure client device 218 to send probe 233 a second end-to-end path to application server 258 also using a WAN link in SD-WAN 207. For example, probe 231, such as a TCP ping, is sent on the first end-to-end path including WAN link 242 coupling SD-WAN appliance 218 to Internet 252, and probe 233 is sent on the second end-to-end path also including WAN link 242. In this example, SDN controller 214 may receive QoE metrics measured from probes 231 and 233, and evaluate the latency metrics with a computed baseline latency value to detect for anomalies in the probing paths.

SDN controller 214 may determine each of the paths has a latency anomaly and determines that the paths have an intersection, e.g., WAN link 242 in SD-WAN 207. In this example, if the latency metric for each of the paths deviates from the baseline latency value, SDN controller 214 may determine that the overlapping WAN link 242 may be the root cause of the latency anomaly.

As further described in FIG. 3 below, SDN controller 214 may, in some examples, determine the type of metric being measured and whether the paths include wired or wireless links when determining the root cause of the anomalies. For example, one of the paths measured by probes 231 and 233 may include a wireless link (e.g., coupling SD-WAN appliance 218 to client device 216. In this example, SDN controller 214 may receive loss metrics and determine that one of the paths includes a wireless link. SDN controller 214 may determine that the wireless link between SD-WAN appliance 218 and client device 216 is a candidate for the root cause of the anomaly (in addition to or as an alternative to WAN link 242). In this example, SDN controller 214 may then configure the edge node to the wireless link, e.g., SD-WAN appliance 218, to send an additional probe on the wireless link to determine if the wireless link is in fact the root cause of the anomaly.

Figure 3:
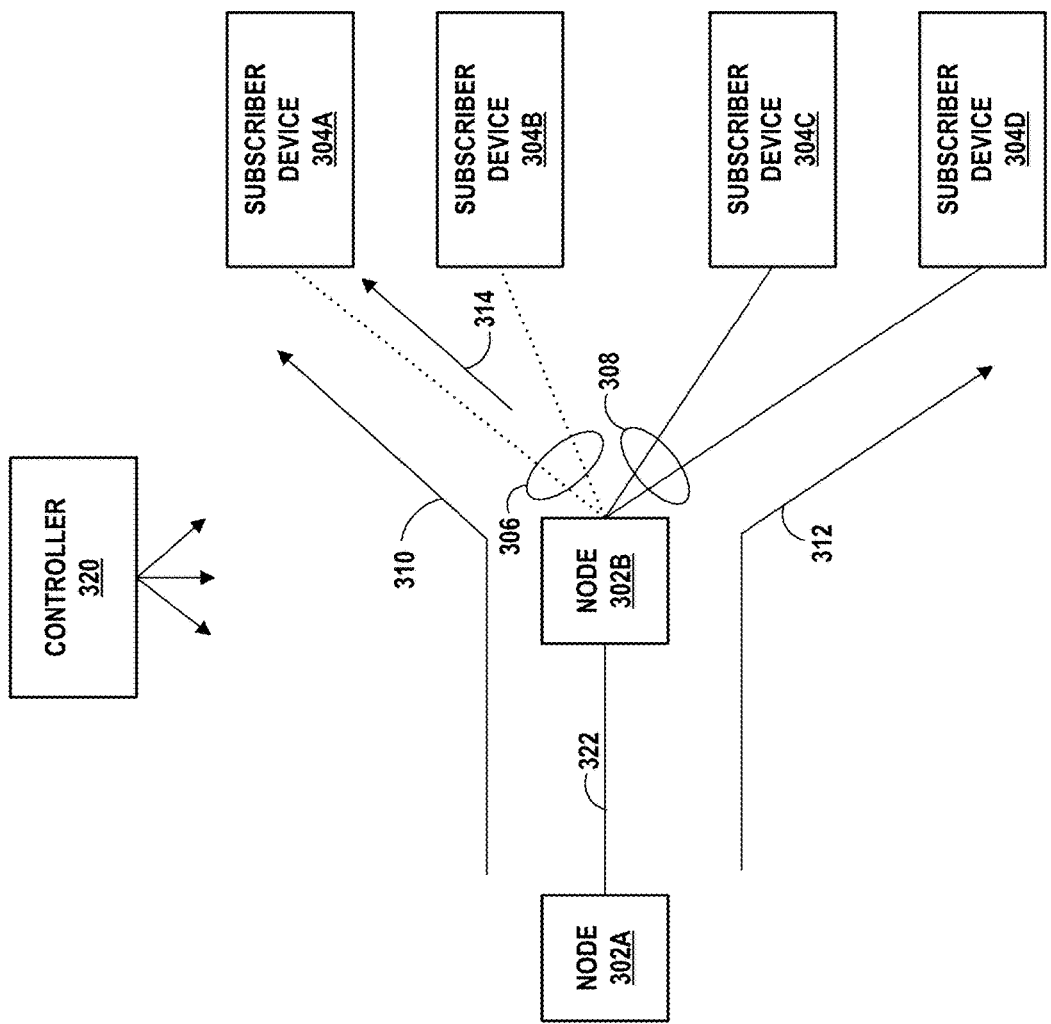
FIG. 3 is a block diagram illustrating an example of fault localization, in accordance with the techniques described in this disclosure.

FIG. 3 is a conceptual diagram illustrating an example operation of fault localization, in accordance with the techniques described in this disclosure. FIG. 3 includes nodes 302A-302B (collectively, "nodes 302") and subscriber devices 304A-304D (collectively, "subscriber devices 304"). Nodes 302 may represent any node in network system 2 of FIG. 1, such as an end host, an underlay network device, and/or a virtual node. Subscriber devices 304 may represent any of subscriber devices 16 of FIG. 1. In the example of FIG. 3, subscriber devices 304A and 304B are connected to node 302B via wireless links 306, respectively. Subscriber devices 304C and 304D are connected to node 302B via wired links 308, respectively.

In this example, controller 320 (e.g., an example instance of SDN controller 14 of FIG. 1) may configure node 302A to send probes along paths to subscriber devices 304. For example, node 302A sends probe 310 to measure one or more QoE metrics for an end-to-end path from node 302A to subscriber device 304A. In this example, probe 310 may measure a loss metric and/or a latency metric. Similarly, node 302A sends probe 312 to measure one or more QoE metrics for an end-to-end path from node 302A to subscriber device 304D. In this example, probe 312 may also measure a loss metric and/or a latency metric.

As one example, SDN controller 320 receives a latency metric from each of probes 310 and 312 and determines if the paths measured by probes 310 and 312 have an anomaly. As one example, SDN controller 320 may compute baseline latency value of 40 milliseconds (ms). If probe 310 measures a latency of 100 ms and probe 312 measures a latency of 120 ms, SDN controller 320 may determine each of the paths has an anomaly because the measured latency deviates from the baseline latency value. In response to determining that the paths measured by probes 310 and 312 have an anomaly, SDN controller 320 may determine an intersection (e.g., overlapping link) of the paths. In this example, link 322 is shared between the paths. SDN controller 320 then determines whether link 322 is the root cause of the latency anomaly. In this example, if the latency metric from probes 310 and 312 deviates from the baseline latency value, then SDN controller 320 determines that shared link 322 is the root cause of the latency anomaly. In some examples, SDN controller 320 may determine whether the measured metrics deviate from the baseline value based on a threshold. The threshold may be user defined or configured through machine learning.

As another example, controller 320 receives the loss metrics from probes 310 and 312 and determines if the paths measured by probes 310 and 312 have an anomaly. As one example, SDN controller 320 may compute a baseline loss value. If probe 310 and probe 312 both measure a loss that deviates from the baseline loss value, SDN controller 320 may, given that the metric is a loss metric, determine whether the paths measured by probes 310 and 312 include a wireless link. As a wireless link is a likely cause of packet loss, SDN controller 320 may determine that the wireless link (e.g., wireless link 306 connecting node 302B and subscriber device 304A) is a possible root cause of the loss anomaly (in addition to or as an alternative to shared link 322). To determine whether the wireless link is the root cause of the packet loss, SDN controller may configure the edge computing device, e.g., node 302B, to send an additional probe packet, e.g., probe packet 314, to measure the loss metric on the wireless link to determine whether the wireless link is the root cause of the loss anomaly.

Figure 4:
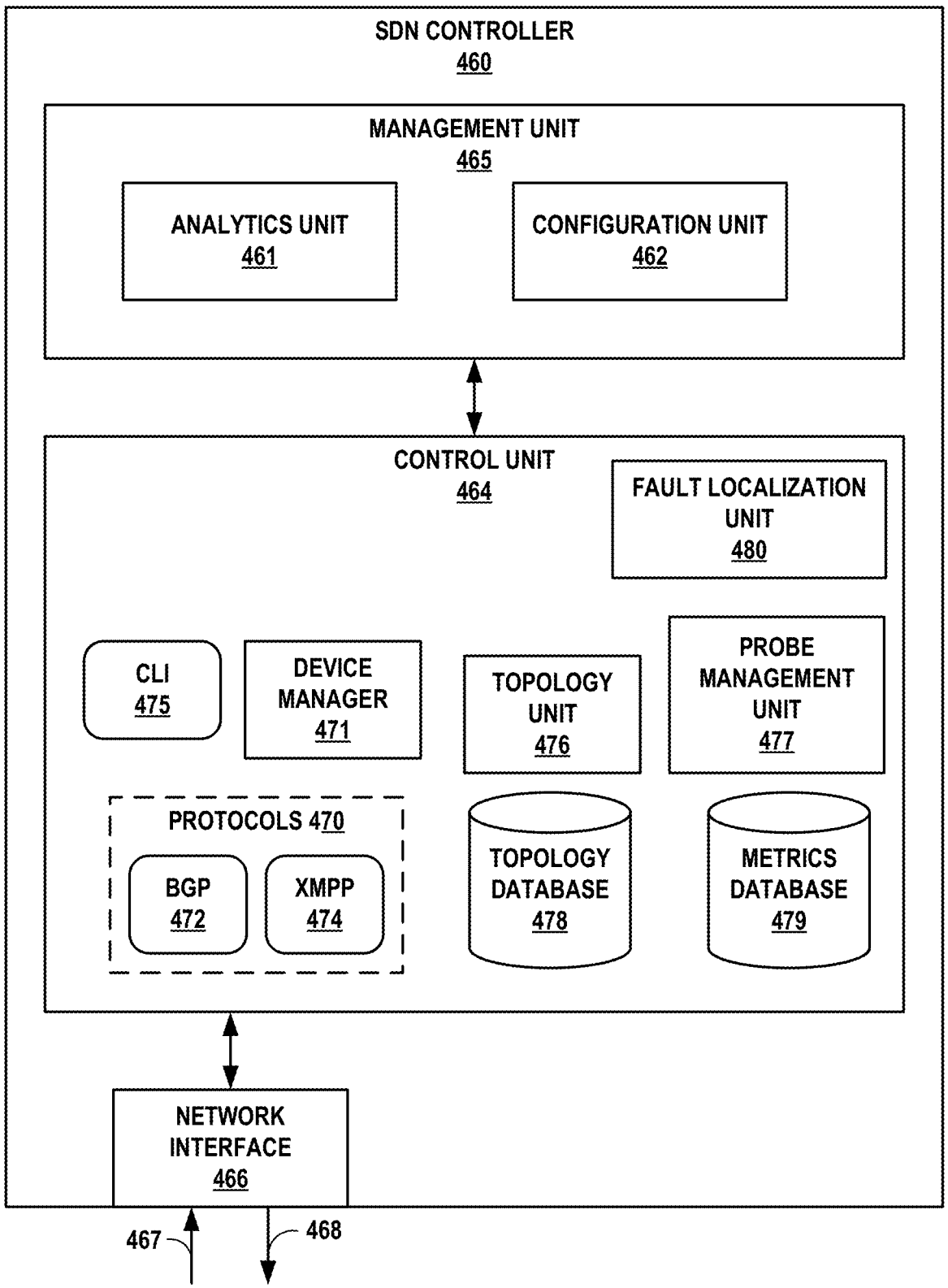
FIG. 4 is a block diagram illustrating an example controller configured to execute one or more functions to perform network monitoring and fault localization, in accordance with the techniques described in this disclosure.

FIG. 4 is a block diagram illustrating the example SDN controller configured to implement the techniques described herein. In the example of FIG. 4, SDN controller 460 creates a topological representation of the network that contains or is managed by SDN controller 460 in order to efficiently create an overall process for probing the various links within the network. SDN controller 460 may operate as a network services controller for a service provider network. In the illustrated example of FIG. 4, SDN controller 460 includes a management unit 465, a control unit 464 for controlling operation of SDN controller 460, and a network interface 466 for exchanging packets with network devices by inbound link 467 and outbound link 468.

In some examples, control unit 464 and/or management unit 465 may be implemented as one or more processes executing on one or more virtual machines of one or more physical computing devices. That is, while generally illustrated and described as executing on a single SDN controller 460, aspects of each of these units may be delegated to or distributed across other computing devices.

Each of control unit 464 and/or management unit 465 may include one or more processors (not shown) that execute software instructions, such as those used to define a software or computer program, stored to a computer-readable storage medium (not shown), such as non-transitory computer-readable mediums including a storage device (e.g., a disk drive, or an optical drive) or a memory (such as Flash memory or RAM) or any other type of volatile or non-volatile memory, that stores instructions to cause the one or more processors to perform the techniques described herein. Alternatively, or additionally, each of control unit 464 and/or management unit 465 may comprise dedicated hardware, such as one or more integrated circuits, one or more application-specific integrated circuits (ASICs), one or more Application Specific Special Processors (ASSPs), one or more FPGAs, or any combination of one or more of the foregoing examples of dedicated hardware, for performing the techniques described herein. The architecture of SDN controller 460 illustrated in FIG. 4 is shown for example purposes only and should not be limited to this architecture. In other examples, SDN controller 460 may be implemented in a variety of ways, such software only, hardware only, or a combination of both software and hardware.

Management unit 465 may comprise a management layer of SDN controller 460, whereas control unit 464 may comprise a control layer of SDN controller 460. Management unit 465 includes an analytics unit 461 and a configuration unit 462. Analytics unit 461 may capture information from physical and/or virtual network elements within an SD-WAN system (e.g., network system 2 of FIG. 1), e.g., a gateway, service nodes 10, or of each data center 9 of FIG. 1, and analyze the information for use in managing the network services offered by the service provider. The information may include statistics, logs, events, and errors.

Configuration unit 462 stores configuration information for the network elements within the SD-WAN system. In some examples, the configuration information comprises a virtual network configuration. Configuration unit 462 may translate a high-level data model of the intended virtual network configuration to a lower-level data model for use in interacting with the network elements.

Control unit 464 of SDN controller 260 implements a centralized control plane for the SD-WAN system that is responsible for maintaining a constantly changing network state. Control unit 464 interacts with the network elements within the SD-WAN system to maintain a consistent network state across all of the network elements. Control unit 464 provides an operating environment for a command line interface daemon 475 ("CLI 475") that provides an interface by which an administrator or other management entity may modify the configuration of SDN controller 460 using text-based commands. Control unit 464 also provides an operating environment for several protocols 470, including Border Gateway Protocol (BGP) 472 and Extensible Messaging and Presence Protocol (XMPP) 474 as illustrated in the example of FIG. 4. These commands may alter which QoE metrics are to be measured, how SDN controller 460 constructs the topology of the network, and whether SDN controller 460 optimizes the distribution of the probing processes being performed across the node devices. The user configuration (e.g., intent-based configuration) may also configure the probes themselves, providing instructions as to whether the probes are active probes, passive probes, or a combination thereof.

In some examples, control unit 264 uses XMPP 274 to communicate with network elements within the SD-WAN system (e.g., router 8, subscriber devices 16, or service nodes 10 of data center 9 within network system 2 of FIG. 1), by an XMPP interface (not shown). Virtual network route data, statistics collection, logs, and configuration information may be sent as extensible markup language (XML) documents in accordance with XMPP 474 for communication between SDN controller 460 and the network elements. Control unit 464 may also use XMPP 474 to communicate with one or both of analytics unit 461 and configuration unit 462 of SDN controller 460.

Control unit 464 further includes device manager 471, topology unit 476, probe management unit 477, topology database 478, and metric database 479, which enables control unit 464 to construct a topological representation of the nodes, links, and probing processes to develop a full probing plan across the topology of the network. SDN controller 460 may be a cloud controller for a network, coordinating and mapping probing processes across the network. For instance, topology unit 476 may construct, for the network that includes a plurality of node devices (e.g., subscriber devices and service nodes), a topological representation of the network. The topological representation may take any form (e.g., a matrix, a database, a graphic, text, or any other data structure) that provides an indication of each of the node devices and an indication of each link of a plurality of links, where each link connects two of the node devices. The topological representation may be stored in topology database 478.

In some examples, topology unit 476 may translate high-level data models associated with a topology of the network into lower-level models suitable for interacting with network elements or devices, such as the network devices shown in FIGS. 1-3. In some cases, topology unit 476 may receive, via network interface 466, high-level data models (e.g., user intent-based network or data models) from an orchestration engine and/or an administrator. These models may be associated with a topology of a network. Topology unit 476 may use these models and intent to construct the topological representation to store within topology database 478.

In constructing the topological representation of the network, topology unit 476 may monitor one or more probe packets sent over each of the plurality of links. For instance, when the techniques described herein are first applied to the network, each node device may be sending probe packets over each of the node device's respective links. However, topology unit 476 may not inherently possess a data structure that depicts which node devices are in the network, and which other node devices each node device is linked to. By monitoring the various probe packets sent across the network, topology unit 476 may populate a data structure, such as an adjacency matrix, with an indication of which node devices are in the network, and which other node devices each node device is sending probe packets to. As the network may be configured such that each node device is performing the probing function for each link connected to the node device, this monitoring function would provide topology unit 476 with a complete representation of the various connections within the network, and topology unit 476 may use graph theory to derive the topological representation of the various node devices and links within the network.

In an effort to optimize the efficiency of the overall system described herein, probe management unit 477 may determine, based on the topological representation of the network, a minimum number of paths that covers all links and a minimum number of nodes within the paths to send probe packets. For example, when selecting the node devices for probing on respective links, probe management unit 477 may perform an optimization algorithm (e.g., greedy algorithm).

Although the above functions may be part of an initialization technique at the beginning of implementing the techniques described herein, these techniques may be repeated when new node devices enter the network. SD-WANs are dynamic in nature, and node devices may enter or leave the network at any time. This means that links are created and removed from the system throughout the existence of the SD-WAN. As such, topology unit 476 and probe management unit 477 may be configured to repeat the processes described herein whenever a new node device enters the system or whenever a current node device leaves the system.

In response to selecting the selected node device to measure the one or more QoE metrics of a path, probe management unit 477 may receive, from the selected node device, a one or more QoE metrics for the path. Probe management unit 477 may store the QoE metrics in metric database 479, such that the QoE metrics may be referenced in further extrapolations and estimations for other links and/or paths.

Device manager 475 may generate vendor-agnostic device information based on the inputs provided by topology database 478 and metrics database 479. Vendor-agnostic device information may also be referred to as device abstract configuration information. Vendor-agnostic device information is agnostic, per-device configuration information for each individual network device in a network. In some examples, vendor-agnostic device information may comprise Extensible Markup Language (XML) schema or Yet Another Next Generation (YANG) schema information.

SDN controller 460 may then utilize device manager 471 to implement one or more translation processes to translate vendor-agnostic device information into vendor-specific device information. Vendor-specific device information may also be referred to as vendor specific, or concrete, device configuration information. Each individual network device in the network may have both vendor-agnostic device information and vendor-specific device information. In some examples, vendor-specific device information may be customizable via the use, e.g., of Jinja2 templates for each different vendor.

As a result, device manager 471 may be configured to generate both vendor-agnostic device information and vendor-specific device information in the manner illustrated in FIG. 4. Vendor-agnostic device information may include vendor-agnostic device configuration and/or command information (e.g., entered via CLI 475 or other management interface), and vendor-specific device information may include vendor-specific device configuration and/or command information, as well (e.g., sent via network interface 466 and/or via protocols 470). SDN controller 460 illustrated in FIG. 4 may send vendor-specific device information to individual network devices for which the vendor-specific device information has been generated. For example, SDN controller 460 may provide vendor-specific device configuration information to a network device via a configuration interface, and may provide vendor-specific device command information to a network device via a command interface. In this example, vendor-specific device configuration information and vendor-specific device command information may each be included in vendor-specific device information, which is translated from vendor-agnostic device information. Additional information regarding translation of high-level configuration instructions to low-level device configuration can be found in U.S. patent application Ser. No. 15/198,657, filed Jun. 30, 2016, and entitled TRANSLATING HIGH-LEVEL CONFIGURATION INSTRUCTIONS TO LOW-LEVEL DEVICE CONFIGURATION, which is hereby incorporated by reference.

These techniques may enable probe management unit 477 to create a dynamic representation of the QoE metrics for each link and each possible connection, in all directions, in topology database 478 and metrics database 479. For instance, probe management unit 477 may store the received measurements for each link in metrics database 479. Then, for each extrapolation/estimation (e.g., for each reverse direction of the received QoE metrics, for each logical path connecting two node devices also connected by a link, and for each complex path that is a shortest path between two node devices not connected directly by a link) indicated in topology database 478, probe management unit 477 may store the respective estimated QoE metrics in metrics database 79. This information may be updated as new metrics are received by probe management unit 477. With this information, whenever SDN controller 460 must make a routing decision for application traffic or for traffic between nodes, SDN controller 460 may reference topology database 478 and the QoE metrics stored within metrics database 479 to make routing decisions for the traffic within the network.

SDN controller 460 is one example instance of a controller configured to perform the techniques described in this disclosure. SDN controller 460 may include additional units to perform various functions, such as an alarm unit (not shown) to alert users.

In accordance with the techniques described in this disclosure, SDN controller 460 includes fault localization unit 480 to pinpoint the node or link causing the one or more anomalies. For example, SDN controller 460 may receive QoE metrics via network interface 466 from selected nodes in the network. Fault localization unit 480 may evaluate the QoE metrics with a computed baseline value to detect for anomalies in the probing paths. As one example, the computed baseline value may be computed from historical data of the QoE metrics, e.g., QoE metrics stored in metrics database 479, and may be dynamically updated as QoE metrics are updated. In other examples, a user may use CLI 475 to statically configure a computed baseline value.

Fault localization unit 480 may evaluate the received QoE metrics with the computed baseline value to detect for anomalies in the probing paths. If fault localization unit 480 determines that a plurality of paths have anomalies, fault localization unit 480 may determine if the plurality of paths have an intersection, e.g., any overlapping links. For example, fault localization unit 480 may determine from topology database 478 if the probing paths have an intersection (e.g., an overlapping link). In response to determining that the probing paths include an overlapping link, fault localization unit 480 determines whether the at least one overlapping link is the root cause of the anomalies.

For example, fault localization unit 480 may determine whether the QoE metrics for the measured paths deviate from the baseline value. If each of the QoE metrics for the measured paths deviate from the baseline value, then fault localization unit 480 determines that the overlapping link is the root cause of the anomaly.

In some examples, fault localization unit 480 may determine whether the paths include wired or wireless links when determining the root cause of the anomalies. Fault localization unit 480 may determine that the QoE metric is a loss metric. In this example, fault localization unit 480 may determine from topology database 478 whether the probing paths include a wireless link (e.g., whether a link uses wireless protocols). If fault localization unit 480 determines the paths include a loss anomaly, fault localization unit 480 may, given that the metric is a loss metric, determine whether the paths measured by the probes include a wireless link. As a wireless link is a likely cause of packet loss, fault localization unit 480 may determine that the wireless link (e.g., wireless link 306 connecting node 302B and subscriber device 304A of FIG. 3) is a possible root cause of the loss anomaly (in addition to or as an alternative to shared link 322). To determine whether the wireless link is the root cause of the packet loss, fault localization unit 480 may configure the edge computing device to the wireless link to send an additional probe packet on the wireless link to determine whether the wireless link is the root cause of the loss anomaly.

If SDN controller 14 determines that a plurality of paths have anomalies, SDN controller 14 may determine if the plurality of paths have an intersection, e.g., any overlapping links. If the plurality of paths have at least one overlapping link, SDN controller 14 determines whether the at least one overlapping link is the root cause of the anomalies. The root cause determination may depend on the type of QoE metric measured and/or whether the links of the paths include a wireless link.

For example, SDN controller 14 may determine paths 32 and 34 each have a latency anomaly and determines that paths 32 and 34 have at least one overlapping link, e.g., a WAN link in SD-WAN 7. In this example, if the latency metric for each of paths 32 and 34 deviates from the baseline latency value, SDN controller 14 may determine that the overlapping WAN link may be the root cause of the anomalies.

In some examples, SDN controller 14 may determine whether the paths include wired or wireless links when determining the root cause of the anomalies. For example, path 30 may include a wireless link, and path 32 may include a wired link. In this example, SDN controller 14 may receive a first loss metric for path 30 and a second loss metric for path 32 and determine that each of paths 30 and 32 include an anomaly. In this example, SDN controller 14 determines that path 30 includes a wireless link. If the first loss metric for path 30 deviates from the second loss metric for path 32, SDN controller 14 may determine that the wireless link is a candidate for the root cause of the anomaly because a wireless link is more likely to drop packets and thus likely to be the cause of the packet loss. SDN controller 14 may then configure the edge node to the wireless link to send an additional probe, e.g., probe 37, on the wireless link to determine if the wireless link is in fact the root cause of the anomaly.

Figure 5:
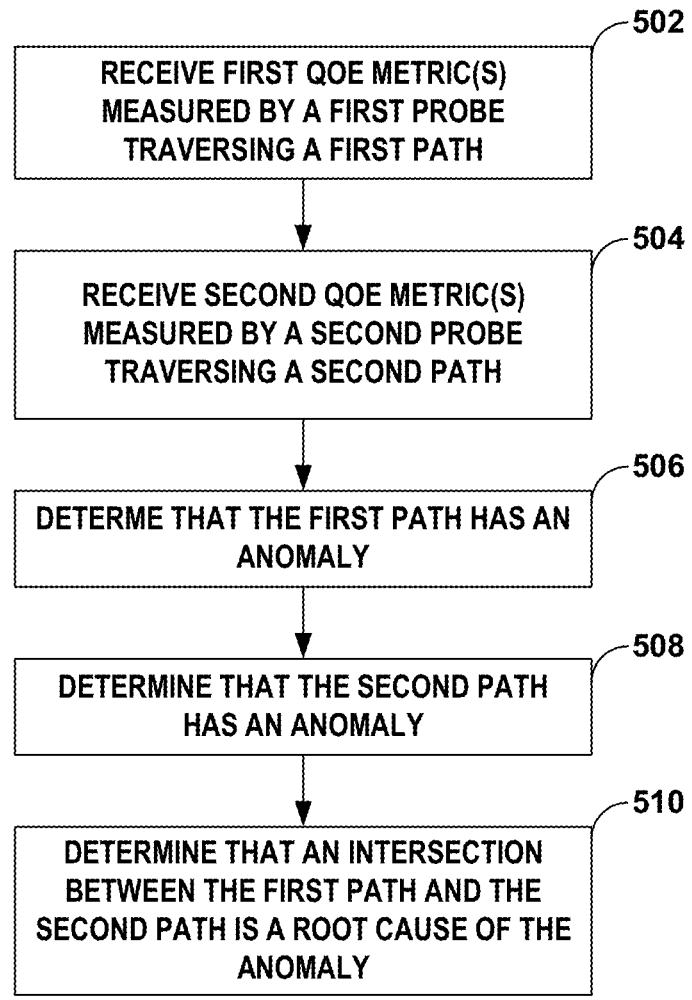
FIG. 5 is a flow diagram illustrating an example operation of fault localization, in accordance with the techniques described in this disclosure.

FIG. 5 is a flow diagram illustrating an example technique for a software-defined wide area network system that performs probe assignment functions based on a topological representation of the network, in accordance with the techniques of this disclosure. The example operation is described with respect to SDN controller 320 from FIG. 3, for example, but may represent any SDN controller described in this disclosure. The following are steps of the process, although other examples of the process performed in the techniques of this disclosure may include additional steps or may not include some of the below-listed steps.

In accordance with the techniques described herein, SDN controller 320 receives a first one or more QoE metrics measured by a first probe traversing a first path comprising one or more links (502). For example, SDN controller 320 may configure node 302A to send probe 310 on a first end-to-end path between node 302A and subscriber device 304A to measure QoE metrics (e.g., latency and loss). SDN controller 320 receives the latency metric and loss metric for the path between node 302A and subscriber device 304A. Similarly, SDN controller 320 may configure node 302A to send probe 312 on a second end-to-end path between node 302A and subscriber device 304D to measure QoE metrics (e.g., latency and loss).

SDN controller 320 receives a second one or more QoE metrics measured by a second probe traversing a second path comprising one or more links (504). For example, SDN controller 320 may configure node 302A to send probe 312 on a second end-to-end path between node 302A and subscriber device 304D to measure QoE metrics (e.g., latency and loss). SDN controller 320 receives the latency metric and loss metric for the path between node 302A and subscriber device 304D.

SDN controller 320 determines, from the first set of QoE metrics, that the first path has an anomaly (506) and determines, from the second set of QoE metrics, that the second path has an anomaly (508). For example, SDN controller 320 may compute a baseline latency value of 40 milliseconds (ms). If probe 310 measures a latency of 100 ms and probe 312 measures a latency of 120 ms, SDN controller 320 may determine each of the paths has an anomaly because the measured latency deviates from the baseline latency value.

SDN controller 320 determines, in response to determining the first path has an anomaly and the second path has an anomaly, an intersection between the first path and the second path (510). For example, in response to determining that the latency metric measured by probes 310 and 312 each deviates from the baseline latency value, SDN controller 320 determines an intersection (e.g., overlapping link 322) between the paths is a root cause of the latency anomaly.

In some examples, SDN controller 320 may determine whether the paths include wired or wireless links when determining the root cause of the anomalies. As one example, SDN controller 320 may compute a baseline loss value. If probe 310 and probe 312 both measure a loss that deviates from the baseline loss value, SDN controller 320 may, given that the metric is a loss metric, determine whether the paths measured by probes 310 and 312 include a wireless link. As a wireless link is a likely cause of packet loss, SDN controller 320 may determine that the wireless link (e.g., wireless link 306 connecting node 302B and subscriber device 304A) is a possible root cause of the loss anomaly (in addition to or as an alternative to shared link 322). To determine whether the wireless link is the root cause of the packet loss, SDN controller 320 may configure the edge computing device, e.g., node 302B, to send an additional probe packet, e.g., probe packet 314, to measure the loss metric on the wireless link to determine whether the wireless link is the root cause of the loss anomaly.

Figure 6:
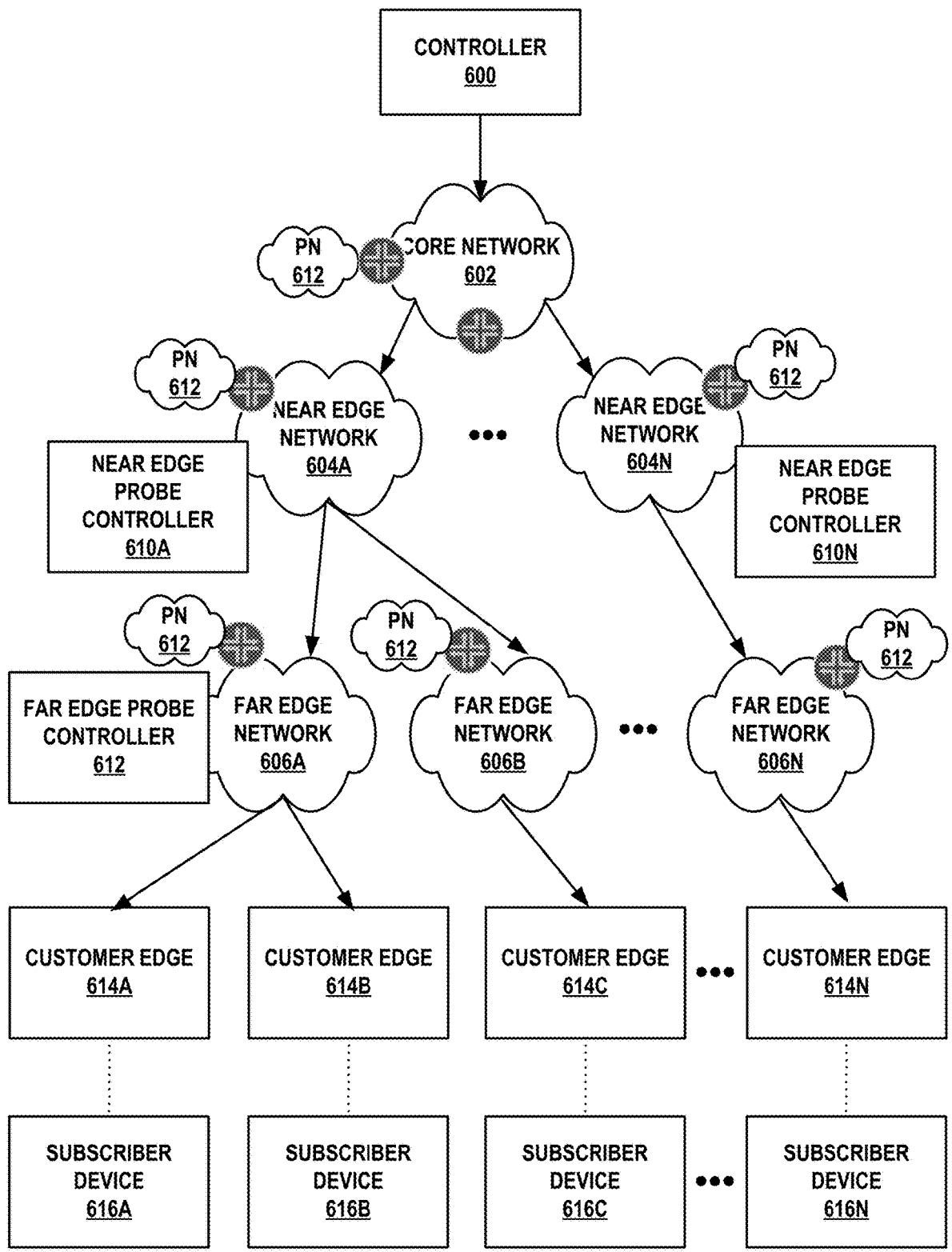
FIG. 6 is a block diagram illustrating an example of a distributed controller, in accordance with the techniques described in this disclosure.

FIG. 6 is a block diagram illustrating an example of a distributed controller, in accordance with the techniques described in this disclosure. In the example of FIG. 6, controller 600 may represent controller 14 of FIG. 1 or any controller of a plurality of network devices.

FIG. 6 illustrates an example edge computing architecture that includes different types of edge nodes from a core network 602 to a customer device, each with different metric (e.g., latency) requirements. Depending on the edge node type, links can be wired or wireless. In this example, customer edge nodes 614A-614N (collectively, "customer edge nodes 614") may have wireless connectivity with subscriber devices 616A-616N (collectively, "subscriber devices 608"). For example, customer edge nodes 614 may represent an edge device for a 5G network or telephone company ("telco") network. In 5G networks, the last hop may include a wireless link to 5G enabled devices, such as subscriber devices 616.

There are different latency requirements at different levels of edge nodes. In this example, there are paths with wired links between a core node to a node in a far edge network (e.g., far edge network 606A) and then wireless links between the base station and customer edge. A node in the near edge network (e.g., 604A) may be responsible for managing edge nodes in a given geographical region. In large scale networks (e.g., where near edge nodes and customer edge nodes are in the order of 1000 s and millions), a distributed probe controller, e.g., controller 600 will be used to configure probes for different nodes as probe generators. In the example of FIG. 6, probe controller instances may be instantiated at different levels of edge nodes, each instance of the probe controller being responsible for configuring probes for its downstream and upstream network paths. In this example, a probe controller instance, e.g., near edge probe controller 610A, may be instantiated at near edge network 604A, near edge probe controller 610N may be instantiated at near edge network 604N, and far edge probe controller 612 may be instantiated at far edge network 606A.

For scalability purposes, a probe controller instance at "near edge," such as near edge probe controller 610A-610N may be responsible for configuring probes for paths to "far edge" nodes in the same region. Similarly, controller instances at "far edge," e.g., far edge probe controller 612, may be responsible for configuring probes to customer edge nodes and end devices. Analysis of the probe results for root cause may be performed at different edge nodes in a distributed manner. For example, the "far edge" site may perform root cause analysis of any failure in the downstream network for which it is responsible. These partial results may be made available to controller instances at higher layers, e.g., controller instances at the "near edge" and "core" nodes for further aggregation for root cause analysis.

The techniques described herein may be implemented in hardware, software, firmware, or any combination thereof. Various features described as modules, units or components may be implemented together in an integrated logic device or separately as discrete but interoperable logic devices or other hardware devices. In some cases, various features of electronic circuitry may be implemented as one or more integrated circuit devices, such as an integrated circuit chip or chipset.

If implemented in hardware, this disclosure may be directed to an apparatus such as a processor or an integrated circuit device, such as an integrated circuit chip or chipset. Alternatively or additionally, if implemented in software or firmware, the techniques may be realized at least in part by a computer-readable data storage medium comprising instructions that, when executed, cause a processor to perform one or more of the methods described above. For example, the computer-readable data storage medium may store such instructions for execution by a processor.

A computer-readable medium may form part of a computer program product, which may include packaging materials. A computer-readable medium may comprise a computer data storage medium such as random access memory (RAM), read-only memory (ROM), non-volatile random access memory (NVRAM), electrically erasable programmable read-only memory (EEPROM), Flash memory, magnetic or optical data storage media, and the like. In some examples, an article of manufacture may comprise one or more computer-readable storage media.

In some examples, the computer-readable storage media may comprise non-transitory media. The term "non-transitory" may indicate that the storage medium is not embodied in a carrier wave or a propagated signal. In certain examples, a non-transitory storage medium may store data that can, over time, change (e.g., in RAM or cache).

The code or instructions may be software and/or firmware executed by processing circuitry including one or more processors, such as one or more digital signal processors (DSPs), general purpose microprocessors, application-specific integrated circuits (ASICs), field-programmable gate arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, functionality described in this disclosure may be provided within software modules or hardware modules.

Various examples have been described. These and other examples are within the scope of the following claims.

The invention claimed is:

1. A method comprising:
    receiving, by a controller for a network that includes a plurality of node devices, a first one or more Quality of Experience (QoE) metrics measured by a first probe traversing a first path comprising one or more links;
    receiving, by the controller, a second one or more QoE metrics measured by a second probe traversing a second path comprising one or more links;
    determining, by the controller and from an evaluation that the first one or more QoE metrics deviate from a baseline value, that the first path has an anomaly;
    determining, by the controller and from an evaluation that the second one or more QoE metrics deviate from the baseline value, that the second path has an anomaly;
    determining, by the controller, a type of metrics of the first one or more QoE metrics and the second one or more QoE metrics, and a type of links of the one or more links of the first path and the one or more links of the second path; and
    determining, by the controller, based on the type of metrics and the type of links and in response to determining the first one or more QoE metrics and the second one or more QoE metrics each deviates from the baseline value, that an intersection between the first path and the second path is a root cause of the anomaly; and
    output, by the controller, data indicating the intersection between the first path and the second path is the root cause of the anomaly.

2. The method of claim 1, wherein the intersection comprises an overlapping link between the one or more links of the first path and the one or more links of the second path.

3. The method of claim 1, wherein the baseline value is computed from one or more historical QoE metrics for the first path.

4. The method of claim 1, wherein the baseline value is statically configured.

5. The method of claim 1,
    wherein determining the intersection is the root cause of the anomaly further comprises:
    in response to determining that the type of metrics is a loss metric and the one or more links of the first path or the one or more links of the second path includes a wireless link, determining that the wireless link is a candidate as the root cause of the anomaly.

6. The method of claim 5, further comprising:
    sending, by the controller, a third probe on the wireless link to measure a QoE metric of the wireless link.

7. A controller for a network that includes a plurality of node devices, the controller comprising:
    one or more processors operably coupled to a memory, wherein the one or more processors are configured to:
    receive a first one or more Quality of Experience (QoE) metrics measured by a first probe traversing a first path comprising one or more links;
    receive a second one or more QoE metrics measured by a second probe traversing a second path comprising one or more links;
    determine, from an evaluation that the first one or more QoE metrics deviate from a baseline value, that the first path has an anomaly;
    determine, from an evaluation that the second one or more QoE metrics deviate from the baseline value, that the second path has an anomaly;
    determine, a type of metrics of the first one or more QoE metrics and the second one or more QoE metrics, and a type of links of the one or more links of the first path and the one or more links of the second path; and
    determine, based on the type of metrics and the type of links and in response to determining the first one or more QoE metrics and the second one or more QoE metrics each deviates from the baseline value, an intersection between the first path and the second path is a root cause of the anomaly;
    output data indicating the intersection between the first path and the second path is the root cause of the anomaly.

8. The controller of claim 7, wherein the intersection comprises an overlapping link between the one or more links of the first path and the one or more links of the second path.

9. The controller of claim 7, wherein the baseline value is computed from one or more historical QoE metrics for the first path.

10. The controller of claim 7,
    wherein the network comprises a first edge and a second edge device, and wherein instances of the controller are distributed to the first edge device to configure the first probe to measure the first one or more QoE metrics and to a second edge device to configure the second probe to measure the second one or more QoE metrics.

11. The controller of claim 7,
wherein to determine the intersection is the root cause of the anomaly, the one or more processors are further configured to:
in response to determining that the type of metrics is a loss metric and the one or more links of the first path and the one or more links of the second path includes a wireless link, determine that the wireless link is a candidate as the root cause of the anomaly.

12. The controller of claim 11, wherein the one or more processors are further configured to:
send a third probe on the wireless link to measure a QoE metric of the wireless link.

13. A non-transitory computer-readable medium comprising instructions for causing one or more programmable processors of a controller to:
receive a first one or more Quality of Experience (QoE) metrics measured by a first probe traversing a first path comprising one or more links;
receive a second one or more QoE metrics measured by a second probe traversing a second path comprising one or more links;
determine, from an evaluation that the first one or more QoE metrics deviate from a baseline value, that the first path has an anomaly;
determine, from an evaluation that the second one or more QoE metrics deviate from the baseline value, that the second path has an anomaly;
determine a type of metrics of the first one or more QoE metrics and the second one or more QoE metrics, and a type of links of the one or more links of the first path and the one or more links of the second path; and
determine, based on the type of metrics and the type of links and in response to determining the first one or more QoE metrics and the second one or more QoE metrics each deviates from the baseline value, that an intersection between the first path and the second path is a root cause of the anomaly;
output data indicating the intersection between the first path and the second path is the root cause of the anomaly.

14. The non-transitory computer-readable medium of claim 13,
wherein determining that the intersection between the first path and the second path is the root cause of the anomaly, the one or more programmable processors are configured to in response to determining that the type of metrics is a loss metric and the one or more links of the first path and the one or more links of the second path includes a wireless link, determine that the wireless link is a candidate as the root cause of the anomaly.

15. The non-transitory computer-readable medium of claim 14, wherein the one or more programmable processors are further configured to:
send a third probe on the wireless link to measure a QoE metric of the wireless link.

* * * * *